United States Patent [19]

Umezono et al.

[11] Patent Number: 4,497,850

[45] Date of Patent: Feb. 5, 1985

[54] METHOD FOR SURFACE TREATMENT OF A MAGNETIC AMORPHOUS ALLOY

[75] Inventors: Akimi Umezono; Hironobu Kawasaki; Takashi Sato; Tomohiko Hayashi, all of Kawasaki, Japan

[73] Assignee: Nippon Steel Corporation, Tokyo, Japan

[21] Appl. No.: 609,140

[22] Filed: May 11, 1984

[30] Foreign Application Priority Data

May 14, 1983 [JP] Japan .................................. 58-84505

[51] Int. Cl.$^3$ .............................................. H01F 10/02
[52] U.S. Cl. ...................................... 427/127; 428/900
[58] Field of Search ........................................ 427/127

Primary Examiner—Bernard D. Pianalto

Attorney, Agent, or Firm—Kenyon & Kenyon

[57] ABSTRACT

The present invention relates to a method for forming on a magnetic amorphous alloy a film which is extremely thin, insulating, and corrosion-resistant and, particularly, can prevent secular deterioration of magnetic properties due to changing of the surface properties of the magnetic amorphous alloy.

The method of the present invention comprises the steps of: applying, on the surface of the magnetic amorphous alloy, a predetermined amount of an acidic solution containing chromic acid, phosphoric acid, and a fluorine compound; and drying and baking the acidic aqueous solution, thereby forming, on the magnetic amorphous alloy, a film substantially comprised of a chromium and a phosphoric compound.

8 Claims, No Drawings

METHOD FOR SURFACE TREATMENT OF A MAGNETIC AMORPHOUS ALLOY

BACKGROUND OF THE INVENTION

1. Field of the Invention

The present invention relates to a method for the surface treatment of a magnetic amorphous alloy. More particularly, the present invention relates to a method for forming on a magnetic amorphous alloy a film which is insulating and corrosion-resistant and, especially, can prevent secular deterioration of the magnetic properties due to chemical and physical changing of the surface properties of the magnetic amorphous alloy.

The amorphous alloy herein is a metal which has a random atomic arrangement like that of liquid and can be produced by supercooling the molten metal on a cooled substrate. The magnetic amorphous alloy comprises a metallic component(s) such as Fe, Co, and/or Ni in a total atomic amount of from 70% to 88%, a metalloid component of from 7% to 25% of B, and, occasionally, a balance of Si, P, and/or C. The magnetic amorphous alloy may further contain up to 5% of Cr, Mo, Nb, and/or V.

Since the production of a magnetic amorphous alloy is simple, as is described above, and since a magnetic amorphous alloy exhibits numerous properties superior to those of a magnetic crystalline alloys, magnetic amorphous alloys has received attention concerning the practical application thereof. Especially, the magnetic properties of an amorphous alloys, are superior to those of the materials currently being used. For example, a magnetic amorphous alloy exhibits less of a watt loss than does a grain-oriented silicon steel sheet by one or more orders of magnitude and also exhibits more of a permeability and magnetic flux density than do Permalloy and ferrite, respectively.

2. Description of the Prior Art

A magnetic amorphous alloy exhibits a poor corrosion resistance, especially when Cr is not added thereto in order to attain an especially high magnetic flux density. In this case, rust spots form on the magnetic amorphous alloy sheet and impair the magnetic properties thereof. Also, thickness of the magnetic amorphous alloy sheet is increased on the portions thereof where rust forms. Due to the increase in the sheet thickness, the space factor of a core made of a magnetic amorphous alloy is lessened.

The present inventors investigated magnetic amorphous alloys and arrived at the following conclusion and the obtained the following results.

A. When a magnetic amorphous alloy is used as a soft magnetic material, an insulating coating is preferably applied on the surface of the magnetic amorphous alloy so as to reduce the eddy current loss. Since a magnetic amorphous alloy sheet is thin and has a rough surface, the space factor of a core made of a magnetic amorphous alloy sheet is low. Such low space factor may be drastically lessened unless the insulating coating of the magnetic amorphous alloy is dense and extremely thin.

B. When a magnetic amorphous alloy which is free of Cr and is not subjected to any surface treatment is exposed to the atmosphere in a room for a period of from ten days to one month, red rust spots form on the surface of the magnetic amorphous alloy. Consequently, the magnetic properties of the portions of the magnetic amorphous alloy where the rust spots formed are impaired and the sheet thickness of the magnetic amorphous alloy is locally increased, with the result that the space factor maybe lessened.

C. A magnetic amorphous alloy containing Cr has an enhanced corrosion resistance but exhibits too low a magnetic flux density to be used, particularly, as a wound core.

D. Metal oxide forms on the surface of a magnetic amorphous alloy during supercooling and solidifying of the Si-containing molten metal. The film of metal oxide contains especially $SiO_2$, is thin and dense and is repellent to water and an aqueous solution. Therefore, even if such thin magnetic amorphous alloy sheet is subjected to a surface treatment with acidic solution having a pH of $0.5 \sim 5$, used for conventional phosphating or the like, it is rather difficult to uniformly apply a coating with good wettability.

E. Nippon Steel Corporation filed Japanese Unexamined Patent Publication No. 59-25998, in which a film comprising (a) a chromium hydrate hydroxide, (b) hydrate chromium hydroxide plus chromium, (c) phosphoric acid plus (a) and/or (b), is disclosed as a coating of the magnetic amorphous alloy.

The disclosed film is formed by the dual stages, including the first rinsing step in the aqueous hydrofluoric acid solution. The film formation is desirably carried out by a singe-stage process.

SUMMARY OF THE INVENTION

It is an object of the present invention to provide a method for the surface treatment of a magnetic amorphous alloy, thereby forming on the magnetic amorphous alloy an extremely thin, insulating, and corrosion-resistant film.

It is another object of the present invention to form, on a magnetic amorphous alloy, an insulating film which can prevent secular changes in the corrosion-resistant properties, as well as in the surface properties, of a magnetic amorphous alloy, such secular changes resulting in the deterioration of the magnetic properties of the magnetic amorphous alloy.

In accordance with the objects of the present invention, there is provided a method for the surface treatment of a magnetic amorphous alloy comprising the steps of:

applying, on the surface of the magnetic amorphous alloy, a predetermined amount of an acidic aqueous solution containing chromic acid, phosphoric acid, and a fluorine compound; and drying and baking the acidic aqueous solution, thereby forming, on the magnetic amorphous alloy, a film substantially comprised of a chromium and a phosphoric compound.

The chromic acid, the phosphoric acid, and the fluorine compound are believed to have the following functions.

The phosphoric acid and the fluorine compound enhance the wetting property of the acidic aqueous solution with respect to the magnetic amorphous alloy. Especially, the fluorine compound is dissociated into the hydrofluoric acid in an acidic aqueous solution, and the resultant hydrofluoric acid partly dissolves the dense oxide film containing $SiO_2$ on the magnetic amorphous alloy. The phosphoric acid and the fluorine compound, especially the fluorine compound, thus have a wetting function, that is, the wettability of the magnetic amorphous alloy is enhanced especially by the fluorine compound.

The chromic acid provides a main element for the film according to the present invention. More specifically, the chromic acid ion is reacted with the phosphoric acid to yield a water-insoluble insulating and corrosion resistant film of chromium phosphate and chromium hydroxide.

The phosphoric acid provides controlling of the pH of the acidic aqueous solution and another main element for the film according to the present invention. The phosphoric acid also plays as a stabilizer for the chromic acid reduction, without causing precipitation of the reduced iron.

DESCRIPTION OF THE PREFERRED EMBODIMENTS

According to an embodiment of the present invention, the acidic aqueous solution has a pH in the range of from 0.5 to 3. In this case, due to the effects of the fluorine compound, the wettability of the magnetic amorphous alloy is especially enhanced. The concentration of the fluorine compound and the phosphoric acid is optional and may be low, provided that the pH of the acidic aqueous solution is from 0.5 to 3. The fluorine compound should be contained in the acidic aqueous solution at an amount which is effective for dissolving the metal oxide formed on the magnetic amorphous alloy but which does not cause excessive dissolving of the magnetic amorphous alloy.

The fluorine compound may be any fluorine-bearing material which yields hydrofluoric acid due to the dissociation thereof in the acidic aqueous solution. According to another embodiment of the present invention, the fluorine compound is at least one member selected from the group consisting of: hydrofluoric acid, a metal or an ammonium salt of hydrofluoric acid (such as potassium fluoride, sodium fluoride, lithium fluoride, ammonium fluoride, or calcium fluoride), hydrosilicofluoric acid, hydroborofluoric acid, hydrotitaniumfluoric acid, and a metal or an ammonium salt of hydro-(silico, boro, titanium)fluoric acid (such as potassium silicofluoride, sodium borofluoride, ammonium borofluoride, or potassium titanium fluoride).

According to yet another embodiment of the present invention, the acidic aqueous solution contains from a 0.01 to 0.1 gram equivalent of the fluorine compound per liter thereof and has a pH of from 0.5 to 3. This pH can be obtained by controlling the concentration of the phosphoric acid. The above-described acidic aqueous solution can realize a slight etching of the oxide film on the magnetic amorphous alloy during the formation of the film according to the present invention.

According to still another embodiment of the present invention, the acidic aqueous solution contains the chromic acid in an amount of from 0.01 to 2 gram ions per liter thereof.

The chromic acid may be present in the acidic aqueous solution either in the form of trivalent or hexavalent ion or both. Hexavalent chromium ion rather than trivalent chromium ion is preferred in the light of enhancing the corrosion resistance of the film according to the present invention and preventing excessive etching due to the dissociated hydrofluoric acid while trivalent chromium ion rather than hexavalent chromium ion is preferred in the light of the drying of the film, and the hydroscopicity of the film. According to a further embodiment of the present invention, the acidic aqueous solution contains the chromic acid in terms of from 0.01 to 2 gram ion of the total chromium ion, in which the hexavalent chromium ion is in an amount of from 0.01 to 0.5 gram ion/l, the balance being trivalent chromium ion. This acidic aqueous solution can be obtained by adding an appropriate amount of a reducing agent to an aqueous solution containing hexavalent chromic acid. The phosphoric acid first controls the pH of the acidic aqueous solution and when hexavalent chromium ion is reduced to trivalent chromium ion. The phosphoric acid stabilizes the reduced trivalent chromium ion. During the reduction reaction, the phosphoric acid and the reduced chromium ion form a complex which keeps the acidic aqueous solution stable until its application on the magnetic amorphous alloy. When the acidic aqueous solution is applied on the magnetic amorphous alloy, a reaction between the phosphoric acid and the surface of the magnetic amorphous alloy takes place, and a film which comprises a phosphate is formed on the surface of the magnetic amorphous alloy. The phosphoric acid herein includes a compound which yields phosphoric acid in an acidic aqueous solution due to the dissociation thereof. The phosphoric acid may be any one of the primary phosphoric acids ($H_2PO_4^-$), the secondary phosphoric acids ($HPO_4^{--}$), or the tertiary phosphoric acids ($PO_4^{---}$), as well as a metal salt of one of these phosphoric acids.

The acidic aqueous solution can be applied on the magnetic amorphous alloy by various procedures. It may be sprayed on or dropped on the magnetic amorphous alloy. Alternatively, the magnetic amorphous alloy may be immersed in the acidic aqueous solution. In addition, the acidic aqueous solution may be applied on a roll and then the roll is rotated over the magnetic amorphous alloy workpiece so as to transfer the solution from the roll to the workpiece. The acidic aqueous solution may be flowed through a narrow slit onto the magnetic amorphous alloy workpiece. The drying may be carried out either at the same step as the application step or at a separate step. The acidic aqueous solution which is applied on the magnetic amorphous alloy by spraying, dropping, or immersing is squeezed by a roll and is then dried by a hot air blast. The acidic aqueous solution may be dried by a hot air blast during the roll application or while it is flowed through a slit.

According to yet a further embodiment of the present invention, the acidic aqueous solution applied on the magnetic amorphous alloy is baked at a temperature of from 150° C. to 250° C.

The baking involves forced heating of the dried film for a short period of time so as to densify the film and to firmly bond it on the surface of the magnetic amorphous alloy, thereby enhancing the insulating property and the corrosion resistance of the film.

According to still another embodiment of the present invention, the thickness of the film is from 0.001 to 0.2 $\mu$m, preferably from 0.01 to 0.1 $\mu$m. If the thickness of the film is less than 0.001 $\mu$m, the corrosion resistance and the insulating property are poor as compared with a film 0.001 $\mu$m or more thick. On the other hand, if the thickness of the film is more than 0.2 $\mu$m, the corrosion resistance and the insulating property are excellent, but the space factor and watt loss tend to be poor as compared with a film 0.2 $\mu$m or less thick. The 0.001~0.2 $\mu$m-thick film according to the present invention exhibits the following properties: a good corrosion resistance, i.e., no rust forms on the surface of the magnetic amorphous alloy after a three-month atmospheric exposure in a room; an insulating property of at least 3 $\Omega$-cm$^2$/sheet; less than a 1% reduction of the space factor due to the film formation; and a watt loss increase of less than 3% due to the film formation.

The space factor tends to be impaired with an increase in the application amount of the acidic aqueous solution. The watt loss generally tends to be impaired with an increase in the film thickness. However, such impairment may be suppressed and even an improvement in the watt loss may be attained provided that the surface film imparts a tensional force to the magnetic amorphous alloy.

The secular changes in the magnetic properties are advantageously suppressed according to the present invention. In the magnetic amorphous alloy having no coating film, secular changes in the properties thereof occur as follows. During the atmospheric exposure in a room, the magnetic amorphous alloy is liable to form rust if the humidity is high. Along with rust formation, the surface property of the magnetic amorphous alloy determining the space factor and the watt loss is deteriorated secularly. In addition, when the magnetic amorphous alloy is shaped as core sections of a transformer and is then dipped in an insulating oil, corrosion due to the insulating oil occurs on the surface of the core sections, with the result that the watt loss may be considerably increased secularly. Contrary to this, in the magnetic amorphous alloy treated by the present invention, a secular change does not occur, and, hence, neither the space factor nor the watt loss deteriorates, which is an outstanding feature of the present invention.

The method according to the present invention may be carried out in a high-speed process, for example, in a line for producing a magnetic amorphous alloy foil, in which the acidic aqueous solution is applied onto the foil by spraying, is squeezed from the foil by a roll, is dried by a hot air blast, and is baked.

Although the amorphous alloy subjected to the method of the present invention is the most advantageously used as magnetic material, it may also be used as corrosion-resistant material.

The present invention is now explained by way of Examples.

COMPARATIVE EXAMPLE

A 30±2 μm-thick and 50 mm-wide thin sheet of magnetic amorphous alloy was produced. The composition of the amorphous alloy was 80.5% Fe, 12% B, 6.5% Si, and 1.0% C. For the purpose of comparison, the thin sheet of magnetic amorphous alloy was not subjected to any kind of treatment.

EXAMPLE 1

The thin sheet of magnetic amorphous alloy of the Comparative Example was conveyed at a line speed of 20 m/min through a line comprising equipment for the following treatments.

Application of Acidic Aqueous Solution

The acidic aqueous solution contained 10 g/l of chromic acid anhydride (approximately 0.1 gram ion of hexavalent chromium ions), 8 g/l of phosphoric acid (approximately 0.1 gram ions/l of phosphoric acid ion), 2.2 g/l of potassium silicofluoride (approximately a 0.06 gram equivalent/l of fluorine), and 0.54 g/l of ethylene glycol (ethylene glycol at this amount theoretically reduces approximately 30% of the hexavalent chromium ion). The pH of the solution was approximately 1.8. The temperature of the acidic aqueous solution was 50° C. The acidic aqueous solution was sprayed over the surface of the thin magnetic amorphous alloy sheet.

Drying

The thin magnetic amorphous alloy sheet was squeezed by a rubber roll to remove excess solution, and the solution remaining on the thin amorphous alloy sheet was dried.

Baking

The acidic aqueous solution was baked at 250° C. for 2 seconds.

The thickness of the film obtained was 0.052±0.005 μm.

EXAMPLE 2

The thin magnetic amorphous alloy sheet of Example 1 was treated, at a line speed of 50 m/min, in the same line as a Example 1 except for the following.

Application of Acidic Aqueous Solution

The acidic aqueous solution contained 50 g/l of chromic acid anhydride (approximately 0.5 gram ion of hexavalent chromium ion), 25 g/l of aluminum biphosphate, 25 g/l of aluminum biphosphate, 5 g/l of phosphoric acid ions (approximately 0.29 gram ion of phosphoric acid ion), and 0.4 g/l of hydrofluoric acid (approximately a 0.02 gram equivalent/l of fluorine). The pH of the solution was approximately 1.6. The thin amorphous alloy strip was immersed in a both of the acidic aqueous solution.

Drying and Baking

The thin amorphous alloy sheet was squeezed by a rubber roll to remove excess solution. The solution remaining on the thin magnetic amorphous alloy sheet was dried and baked at 250° C. for 1.5 seconds.

The thickness of the film was 0.12±0.01 μm.

The following Table 1 shows the properties of the thin amorphous alloy sheets of Comparative Example and Examples 1 and 2.

TABLE 1

| | Insulation Resistance Value Ω-cm²/ sheet | Exposure to Wetting* | Watt Loss† ($W_{13/50}$) | |
|---|---|---|---|---|
| | | | Directly After Production | After Holding in Silicone Oil at 150° C. for 600 Hrs |
| Invention | | | | |
| Example 1 | 6~9 | No abnormality | 0.095 | 0.098 |
| Example 2 | 15~33 | No abnormality | 0.096 | 0.099 |
| Comparative Example | 0.8~1.2 | Formation rust over entire surface | 0.093 | 0.125 |

*The samples were put into a humidity cabinet and were held at a humidity of 98% and a temperature of 49°C for 6 hours.
†The watt loss in watts/kg at a frequency of 50 Hz and a magnetic flux density of 1.3 Tesla.

As is apparent from Table 1, the insulation resistance value and the corrosion resistance attained by the present invention were superior to those of the comparative example, and there was no appreciable secular change in the watt loss in the present invention as there was in the comparative example.

Since magnetic amorphous alloy generally exhibits a poor corrosion resistance, rust forms on the magnetic amorphous alloy sheet. The magnetic properties are impaired due to the rust and the sheet thickness increases on the portions of the magnetic amorphous alloy sheet where the rust has formed.

We claim:

1. A method for surface treatment of a magnetic amorphous alloy comprising the steps of:

applying, on a surface of the magnetic amorphous alloy, a predetermined amount of an acidic aqueous solution containing chromic acid, phosphoric acid, and a fluorine compound; and drying and baking the acidic aqueous solution, thereby forming, on the magnetic amorphous alloy, a film substantially comprised of a chromium and a phosphoric compound.

2. A method according to claim 1, wherein the acidic aqueous solution has a pH in the range of from 0.5 to 3.

3. A method according to claim 1, wherein the fluorine compound is at least one member selected from the group consisting of: hydrofluoric acid, a metal or an ammonium salt of hydrofluoric acid, hydrosilicofluoric acid, hydroborofluoric acid, hydrotitaniumfluoric acid, and a metal or an ammonium salt of hydro-(silico, boro, titanium)fluoric acid.

4. A method according to claim 1, wherein the acidic aqueous solution contains from a 0.01 to a 0.1 gram equivalent of the fluorine compound per liter thereof and has a pH of from 0.5 to 3.

5. A method according to claim 1, wherein the acidic aqueous solution contains the chromic acid in an amount of from 0.01 to 2 gram ion per liter thereof.

6. A method according to claim 1, wherein the acidic aqueous solution contains the chromic acid in terms of from 0.01 to 2 gram ion of the total chromium ions, in which hexavalent chromium ion are in an amount of from 0.01 to 0.5 gram ion/l, the balance being trivalent chromium ion.

7. A method according to claim 1, wherein the acidic aqueous solution applied on the magnetic amorphous alloy is dried at a temperature from 150° C. to 250° C.

8. A method according to claim 1, wherein the thickness of the film is from 0.001 to 0.2 μm, preferably from 0.01 to 0.1 μm.

* * * * *